United States Patent
Hughes et al.

(10) Patent No.: US 8,251,570 B2
(45) Date of Patent: Aug. 28, 2012

(54) METHOD FOR BLENDING OF CONCENTRATIONS FOR DILUTION ON THE FLY

(75) Inventors: Ronnie D. Hughes, The Woodlands, TX (US); Robert L. Clark, Houston, TX (US); Robert R. Rupe, III, Katy, TX (US); Rudolf J. Novotny, Montgomery, TX (US)

(73) Assignee: Baker Hughes Incorporated, Houston, TX (US)

( * ) Notice: Subject to any disclaimer, the term of this patent is extended or adjusted under 35 U.S.C. 154(b) by 915 days.

(21) Appl. No.: 12/198,062

(22) Filed: Aug. 25, 2008

(65) Prior Publication Data
US 2010/0046316 A1 Feb. 25, 2010

(51) Int. Cl.
*E21B 43/267* (2006.01)
(52) U.S. Cl. ............ 366/152.1; 166/305.1; 166/308.3; 166/308.4
(58) Field of Classification Search ............ 366/152.1; 166/305.1, 308.1, 308.3, 308.4
See application file for complete search history.

(56) References Cited

U.S. PATENT DOCUMENTS

| | | | |
|---|---|---|---|
| 3,161,203 A * | 12/1964 | Hathorn et al. | 137/8 |
| 4,635,678 A * | 1/1987 | Peterman et al. | 137/551 |
| 4,794,806 A * | 1/1989 | Nicoli et al. | 73/863.01 |
| 5,281,023 A * | 1/1994 | Cedillo et al. | 366/17 |
| 5,799,734 A * | 9/1998 | Norman et al. | 166/278 |
| 6,491,421 B2 | 12/2002 | Rondeau et al. | |
| 6,786,629 B2 | 9/2004 | Rondeau et al. | |
| 7,056,008 B2 | 6/2006 | Rondeau et al. | |
| 7,090,017 B2 * | 8/2006 | Justus et al. | 166/308.1 |
| 7,201,071 B2 * | 4/2007 | Wei et al. | 73/863.03 |
| 7,226,203 B2 | 6/2007 | Rondeau et al. | |
| 7,621,328 B1 | 11/2009 | Case et al. | |
| 7,621,329 B1 * | 11/2009 | Case et al. | 166/279 |
| 7,621,330 B1 | 11/2009 | Case et al. | |
| 2009/0281006 A1 | 11/2009 | Walters et al. | |

* cited by examiner

*Primary Examiner* — Robert B Davis
(74) *Attorney, Agent, or Firm* — John Wilson Jones; Jones & Smith, LLP

(57) ABSTRACT

A process for concentrating and diluting a treatment substance to provide a diluted treatment for introduction to a wellbore is disclosed. In one embodiment, the process includes measuring a treatment fluid flow rate. The process also includes blending the treatment fluid with a treatment substance to produce a concentrated treatment fluid. The process further includes measuring a flow rate of the concentrated treatment fluid. Moreover, the process includes determining a difference between the treatment fluid flow rate and the flow rate of the concentrated treatment fluid. In addition, the process includes comparing the difference to a target difference. The process additionally includes adjusting the difference to be within a desired range of the target difference and diluting the concentrated treatment fluid to provide the diluted treatment fluid.

20 Claims, 11 Drawing Sheets

METHOD FOR BLENDING OF CONCENTRATIONS FOR DILUTION ON THE FLY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates to the field of treatment fluids and more specifically to the concentration and dilution of treatment fluids.

2. Background of the Invention

Hydraulic fracturing is a treatment typically performed on oil and gas wells to create fractures in the formation. The treatment involves pumping fracturing fluids at high pressures into the wells to create the fractures. The fracturing fluids enter the fractures to extend the fractures into the formation.

Typically, proppants are mixed with the fracturing fluid to keep the fracture open after the treatment is performed. Proppants are sized particles such as sand or ceramics. The proppants are conventionally transported with a carrier fluid. Other dry materials such as polymers may also be mixed with fluids to facilitate the treatment of the wells. The proppants and the polymers are not typically mixed with the appropriate fluids prior to the pumping operations but instead are mixed at the pumping operations (i.e., on the fly). Drawbacks to conventional use of proppants and polymers for treatment of wells includes measuring their concentrations. For instance, it is typically very difficult to measure low concentrations of proppants used in treatments such as partial monolayer treatments. Further difficulties include increased difficulties in measurements for applications introducing light weight proppants with specific gravities near the specific gravity of the carrier fluids.

Consequently, there is a need for an improved method of introducing dry materials to wells. Further needs include improved methods for preparing concentrations of proppants or other dry materials on the fly to achieve a desired concentration downhole. Additional needs include improved methods for measuring concentrations in treatment fluids.

BRIEF SUMMARY OF SOME OF THE PREFERRED EMBODIMENTS

These and other needs in the art are addressed in one embodiment by a process for preparing a diluted treatment fluid for introduction to a wellbore. The process includes measuring a treatment fluid flow rate. The process also includes blending the treatment fluid with a treatment substance to produce a concentrated treatment fluid. The process further includes measuring a flow rate of the concentrated treatment fluid. In addition, the process includes determining a difference between the treatment fluid flow rate and the flow rate of the concentrated treatment fluid. Moreover, the process includes comparing the difference to a target difference. The process additionally includes adjusting the difference to be within a desired range of the target difference and diluting the concentrated treatment fluid to provide the diluted treatment fluid.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
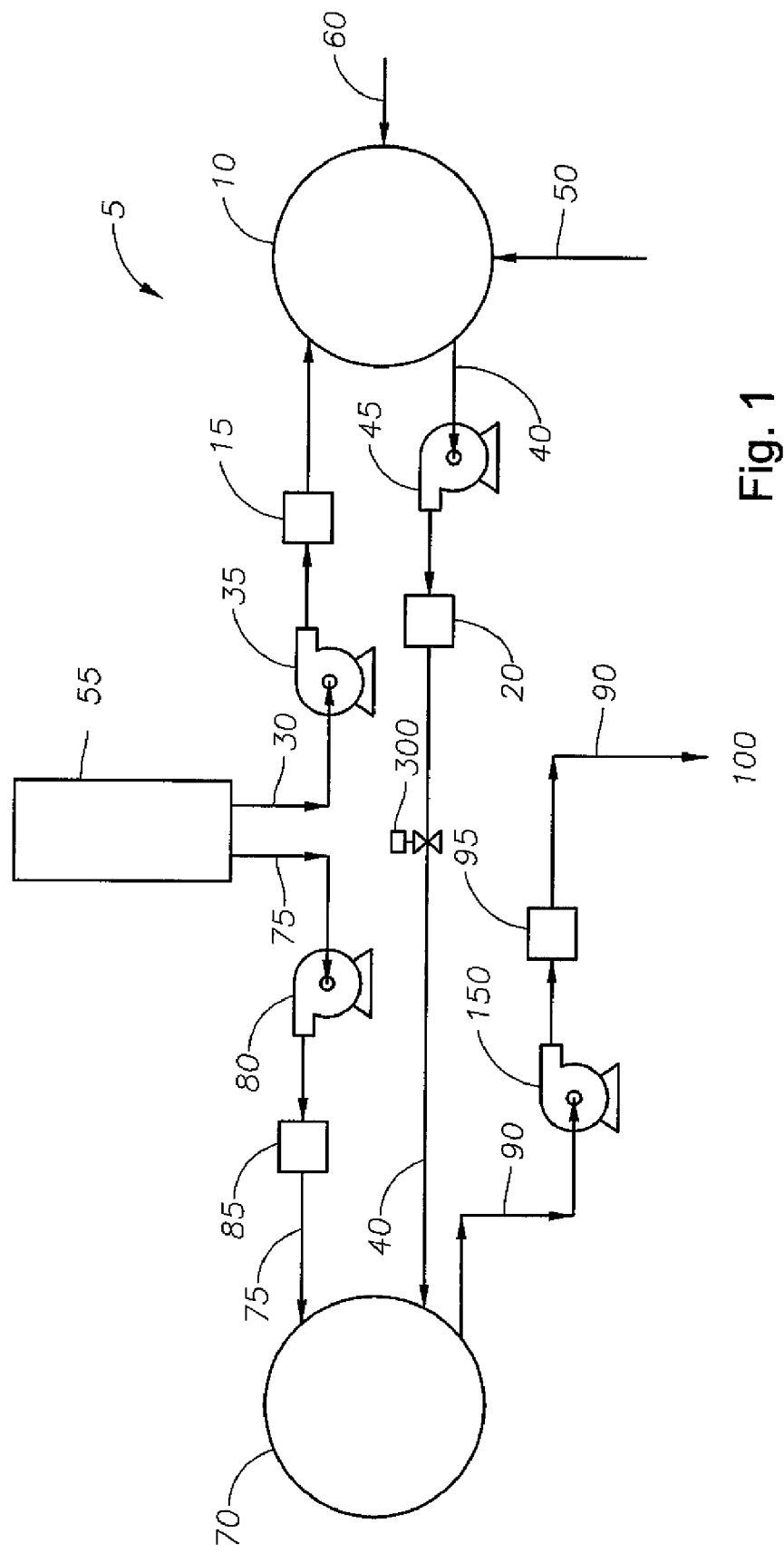
FIG. 1 illustrates a process for the concentration and dilution of a treatment fluid having a concentration blender and a dilution blender.

FIG. 1 illustrates a process 5 for concentrating a treatment substance in a treatment fluid and then diluting the concentrated treatment fluid to pump downhole. Process 5 includes providing treatment fluid 30, treatment substance 60, concentration blender 10, dilution blender 70, flow meters, and pumps. Without limitation, process 5 allows for measurements of treatment substance 60 concentrations in a treatment fluid 30 that has a similar specific gravity to treatment substance 60. Treatment fluid 30 may be any fluid suitable for use in treating a wellbore. It is to be understood that treating a wellbore refers to actions that address wellbore conditions. Without limitation, examples of treatments include hydraulic fracturing, isolation, controlling gas, and the like. In some embodiments, treatment fluid 30 includes a fluid designed for a desired wellbore treatment. Without limitation, examples of suitable treatment fluids 30 include water, diesel, mineral oil, gels, foam, acid, or any combination thereof. In an embodiment, treatment fluids 30 include fluids suitable for fracturing a wellbore. Treatment substance 60 may include any substance suitable for treatment of a wellbore. Without limitation, examples of treatment substances 60 include proppants, polymers, and cement and/or glass beads. In an embodiment, treatment substances 60 include proppants. Without limitation, examples of proppants include sand, resin-coated sand, ceramics, and the like. In some embodiments, treatment substances 60 include polymers. In an embodiment, the polymers include polymers that are suitable for a liquid frac concentrate. In such an embodiment, the polymers include guar, derivatized cellulosic polymer, and chemically modified guar gum. It is to be understood that a liquid frac concentrate refers to a slurried polymer suspension used to prepare hydraulic fracturing fluid systems. In some embodiments, treatment substances 60 include cement, alternatively cement and glass beads. Concentration blender 10 and dilution blender 70 may include any blenders suitable for blending materials. As illustrated in FIG. 1, process 5 has flow meters that include concentration blender inlet flow meter 15, concentration blender outlet flow meter 20, dilution blender inlet flow meter 85, and outlet flow meter 95. The flow meters may include any flow meter suitable for measuring volumetric or mass flow rates. Without limitation, examples of suitable flow meters include magnetic flow meters, coriolis flow meters, and turbine meters. In an embodiment, the flow meters are magnetic flow meters. As further illustrated in FIG. 1, process 5 has pumps that include concentration blender inlet feed pump 35, concentration outlet pump 45, dilution feed pump 80, and outlet pump 150. The pumps may include any pump suitable for pumping a liquid.

Figure 2:
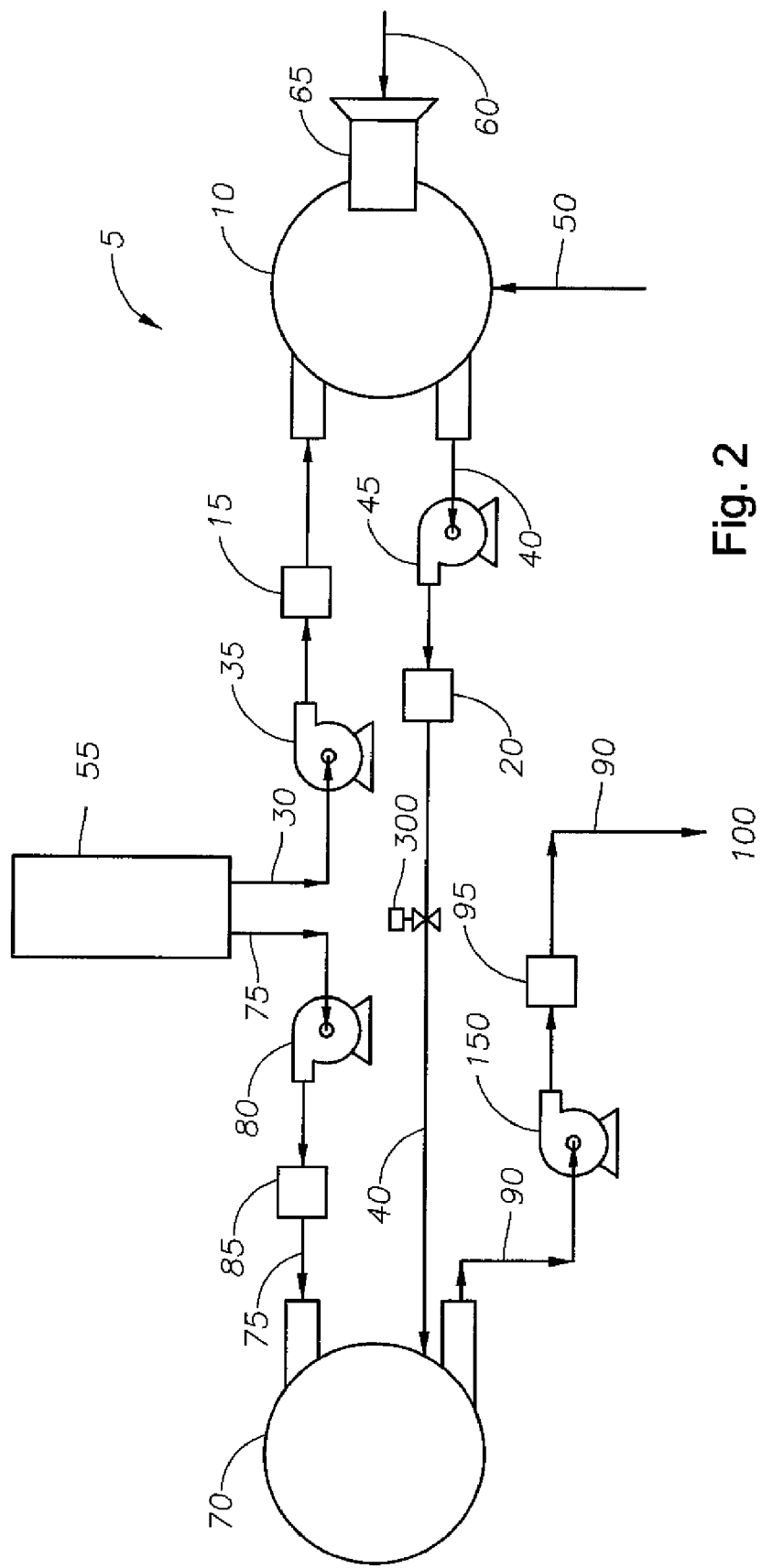
FIG. 2 illustrates a process for the concentration and dilution of a treatment fluid having a concentration blender, a sand screw assembly, and a dilution blender.

In an embodiment of the operation of process 5 as illustrated in FIG. 1, treatment fluid 30 is fed from treatment fluid supply 55 to concentration blender 10 via concentration blender inlet feed pump 35. Treatment fluid supply 55 may include any suitable method of supplying a treatment fluid. In an embodiment, treatment fluid supply 55 is a frac tank, alternatively more than one frac tank. It is to be understood that a frac tank is a tank suitable for supplying a fluid for a well fracturing treatment. The flow rate of treatment fluid 30 into concentration blender 10 is measured by concentration blender inlet flow meter 15. Concentration blender inlet flow meter 15 may be located at any position between concentration blender inlet feed pump 35 and concentration blender 10 that is suitable for measuring the flow of treatment fluid 30. Treatment substance 60 is fed to concentration blender 10 and blended with treatment fluid 30 to provide concentrated treatment fluid 40. In alternative embodiments, additives 50 may be added to concentration blender 10 and blended with treatment fluid 30 and treatment substance 60. Additives 50 may include any additives suitable for a desired concentrated treatment fluid 40. For instance, additives 50 may include surfactants. In alternative embodiments, no additives 50 are added to concentration blender 10. It is to be understood that an appropriate treatment substance 60 is blended with treatment fluid 30 to provide a desired concentrated treatment fluid 40. In an embodiment, the desired concentrated treatment fluid 40 is a liquid frac concentrate. In such an embodiment, treatment substance 60 is a polymer, and treatment fluid 30 is a diesel or a mineral oil. In other embodiments, the desired concentrated treatment fluid 40 is a proppant slurry (i.e., fracturing fluid), and treatment substance 60 is a proppant. FIG. 2 illustrates an embodiment of process 5 in which concentrated treatment fluid 40 is a proppant slurry. As shown in FIG. 2, treatment substance 60 is a proppant that is added to concentration blender 10 via sand screw assembly 65. Sand screw assembly 65 may include any sand screw assembly suitable for feeding a proppant such as sand to concentration blender 10. It is to be understood that process 5 is not limited to feeding proppant by sand screw assembly 65 but instead may include any other method suitable for adding proppant to concentration blender 10.

As shown in FIGS. 1 and 2, concentrated treatment fluid 40 exits concentration blender 10 and is pumped by concentration outlet pump 45 to dilution blender 70. In some embodiments, the flow rate of concentrated treatment fluid 40 to dilution blender 70 may be controlled by valve 300. Valve 300 may be any valve suitable for controlling a liquid flow such as a V-port ball valve. The flow rate of concentrated treatment fluid 40 from concentration blender 10 is measured by concentration blender outlet flow meter 20. Concentration blender outlet flow meter 20 may be located at any position between concentration outlet pump 45 and dilution blender 70 that is suitable for measuring the flow of concentrated treatment fluid 40. By measuring the inlet fluid flow rate (treatment fluid 30 flow rate) and the outlet fluid flow rate (concentrated treatment fluid 40 flow rate) of concentration blender 10, the difference between the inlet and outlet flow rates may be determined. From the difference, the volume of treatment substance 60 added to concentration blender 10 is determined, which allows the weight of treatment substance 60 added per volume of liquid (e.g., treatment fluid 30) to be determined. The determinations may be accomplished by any suitable method. By measuring the inlet and outlet flow rates, the amount of treatment substance 60 fed to concentration blender 10 may be adjusted. In some embodiments, a target difference may be provided that corresponds to a desired amount of treatment substance 60 in concentrated treatment fluid 40. The difference between the measured flow rates of concentration blender inlet and outlet flow meters 15, 20 may be compared to the target difference. The difference between the measured flow rates is adjusted until about equal to the target flow rate difference or within a desired range of the target flow rate difference. The measured flow rates are adjusted by adjusting the feed of treatment substance 60, adjusting the flow rate of treatment fluid 30, or any combination thereof. For instance, in an embodiment as illustrated in FIG. 2, the feed rate of sand screw assembly 65 is adjusted to control the feed of treatment substance 60 (e.g., proppant) to concentration blender 10 and/or the flow rate of treatment fluid 30 is adjusted to achieve the desired difference between the measured flow rates. Because the specific gravity of treatment substance 60 is known, the measured difference corresponds to the volume of treatment substance 60 added. By adjusting the flow rates (i.e., inlet flow rate of treatment fluid 30) and/or the feed of treatment substance 60 to concentration blender 10, the difference between the measured flow rates is controlled and thereby properties of concentrated treatment fluid 40 are controlled. The properties include density of concentrated treatment fluid 40 and the concentration of treatment substance 60 in concentrated treatment fluid 40. In an embodiment, the target difference corresponds to the desired concentration of treatment substance 60 in concentrated treatment fluid 40. In some embodiments, the property is the density of concentrated treatment substance 40. In other embodiments, the property is the concentration of treatment substance 60 in concentrated treatment substance 40. In embodiments in which additives 50 are added, the volume of treatment substance 60 may be determined by subtracting the volume of treatment fluid 30 and the volume of additives 50 added to concentration blender 10 from the volume of concentrated treatment fluid 40 exiting concentration blender 10.

As further shown in FIGS. 1 and 2, dilution blender 70 dilutes concentrated treatment fluid 40 with dilution fluid 75. In the embodiments illustrated in FIGS. 1 and 2, dilution fluid 75 is from treatment fluid supply 55 and is the same fluid as treatment fluid 30. For instance, in an embodiment in which treatment substance 60 is a proppant, treatment fluid 30 and dilution fluid 75 may both be water. In alternative embodiments, dilution fluid 75 is from a different treatment fluid supply than treatment fluid 30. In other alternative embodiments, dilution fluid 75 is a different treatment fluid than treatment fluid 30. For instance, in an embodiment in which treatment substance 60 is a liquid frac concentrate, treatment fluid 30 is a diesel or mineral oil, and dilution fluid 75 is water. Dilution fluid 75 is fed to dilution blender 70 via dilution feed pump 80. The flow rate of dilution fluid 75 into dilution blender 70 is measured by dilution blender inlet flow meter 85. Dilution blender inlet flow meter 85 may be located at any position between dilution feed pump 80 and dilution blender 70 that is suitable for measuring the flow of dilution fluid 75. Dilution fluid 75 is blended with concentrated treatment fluid 40 in dilution blender 70 to provide diluted treatment fluid 90.

In the embodiments of FIGS. 1 and 2, diluted treatment fluid 90 exits dilution blender 70 and is pumped by outlet pump 150 downhole in wellbore 100. In some embodiments, outlet pump 150 may pump diluted treatment fluid 90 to frac pumps (not illustrated), which may pump diluted treatment fluid 90 downhole in wellbore 100. It is to be understood that process 5 is not limited to providing diluted treatment fluid 90 downhole in wellbore 100 but instead may provide diluted treatment fluid 90 to any other desired location. For instance, diluted treatment fluid 90 may be provided to storage, a transportation vehicle, and the like. The flow rate of diluted treatment fluid 90 is measured by outlet flow meter 95. Outlet flow meter 95 may be located at any position downstream of outlet pump 150 that is suitable for measuring the flow of diluted treatment fluid 90. With the volume of treatment substance 60 in concentrated treatment fluid 40 determined, the inlet flow rates to dilution blender 70 are adjusted to control the properties of diluted treatment fluid 90. In alternative embodiments, the inlet flows are adjusted to adjust properties of diluted treatment fluid 90 in light of the known properties of concentrated treatment fluid 40. For instance, the inlet flow rates are adjusted to adjust the density of diluted treatment fluid 90 or the concentration of treatment substance 60 in diluted treatment fluid 90.

In some embodiments of process 5 as illustrated in FIGS. 1 and 2, concentration blender inlet flow meter 15 and dilution blender inlet flow meter 85 measure the inlet flow rates of treatment fluid 30 and dilution fluid 75. Outlet flow meter 95 measures the outlet flow rate from process 5. The difference between the total of the inlet flow rates and the outlet flow rate of process 5 is determined. From the difference, the volume of treatment substance 60 added is determined. It is to be understood that the actual difference corresponds to the volume of treatment substance 60 added. The actual difference may be compared to a target difference with the target difference corresponding to target properties of diluted treatment fluid 90. The flow rates and/or the feed of treatment substance 60 are adjusted to adjust the difference to be about equal or within a desired range of the target difference. Such adjustment therefore controls the properties of diluted treatment fluid 90.

Figure 3:
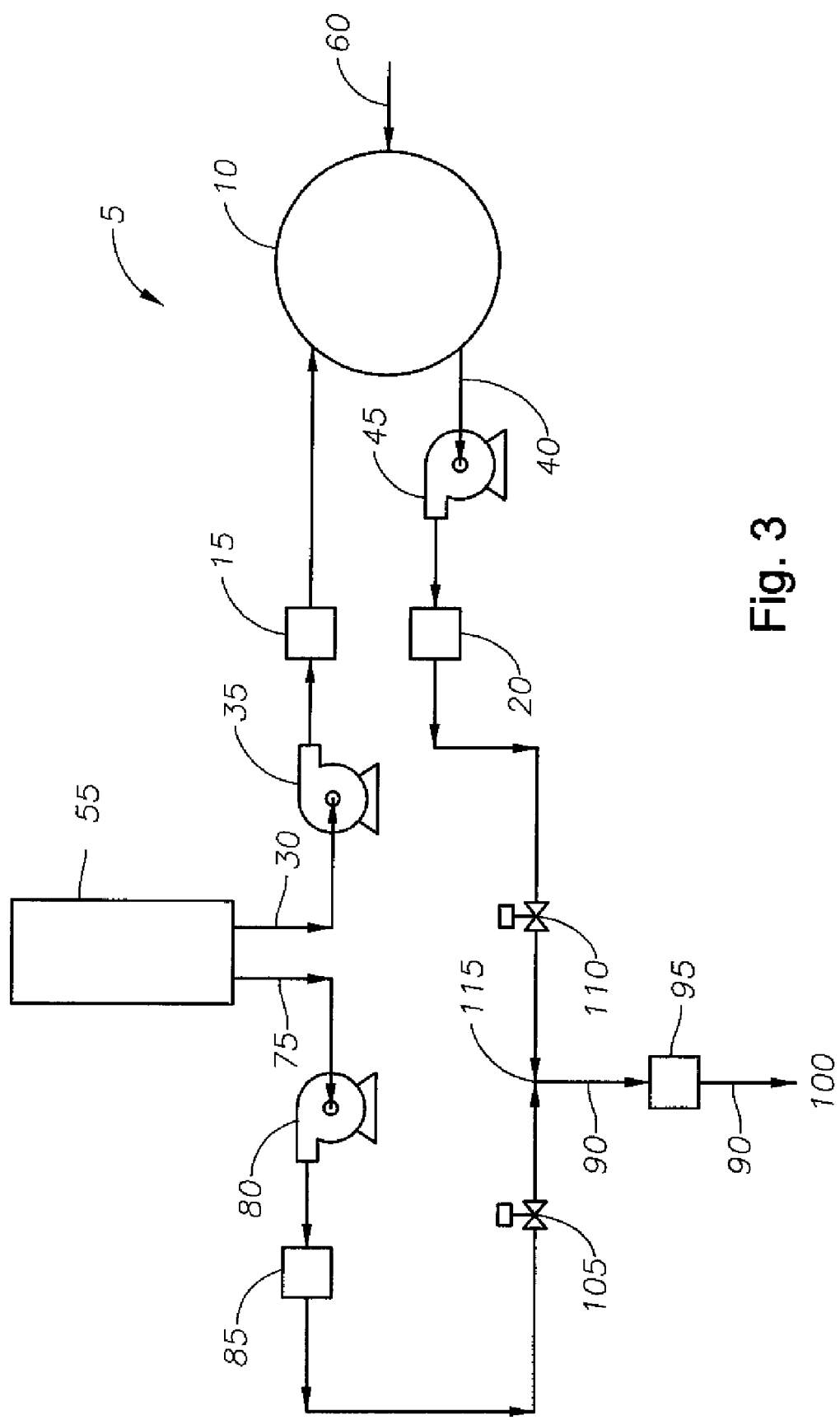
FIG. 3 illustrates a process for the concentration and dilution of a treatment fluid having a concentration blender and a dilution mix section.

FIG. 3 illustrates an alternative embodiment of process 5 in which process 5 does not include dilution blender 70. Instead, process 5 has dilution mix section 115. Dilution mix section 115 may be a pipe section by which the process pipes for dilution fluid 75 and concentrated treatment fluid 40 combine into the process piping for diluted treatment fluid 90. The streams of dilution fluid 75 and concentrated treatment fluid 40 flowing together at dilution mix section 115 provide sufficient mixing to provide diluted treatment fluid 90. Dilution valve 105 and concentrated valve 110 control the flow of dilution fluid 75 and concentrated treatment fluid 40, respectively, to dilution mix section 115. Dilution valve 105 and concentrated valve 110 may be any type of valve suitable for controlling the flow of a liquid. The flow rate of diluted treatment fluid 90 is measured by outlet flow meter 95. Outlet flow meter 95 may be located at any position downstream of dilution mix section 115 that is suitable for measuring the flow of diluted treatment fluid 90. In alternative embodiments (not illustrated), process 5 includes a pump suitable for pumping diluted treatment fluid 90. The pump may be disposed at any suitable position between dilution mix section 115 and outlet flow meter 95.

Figure 4:
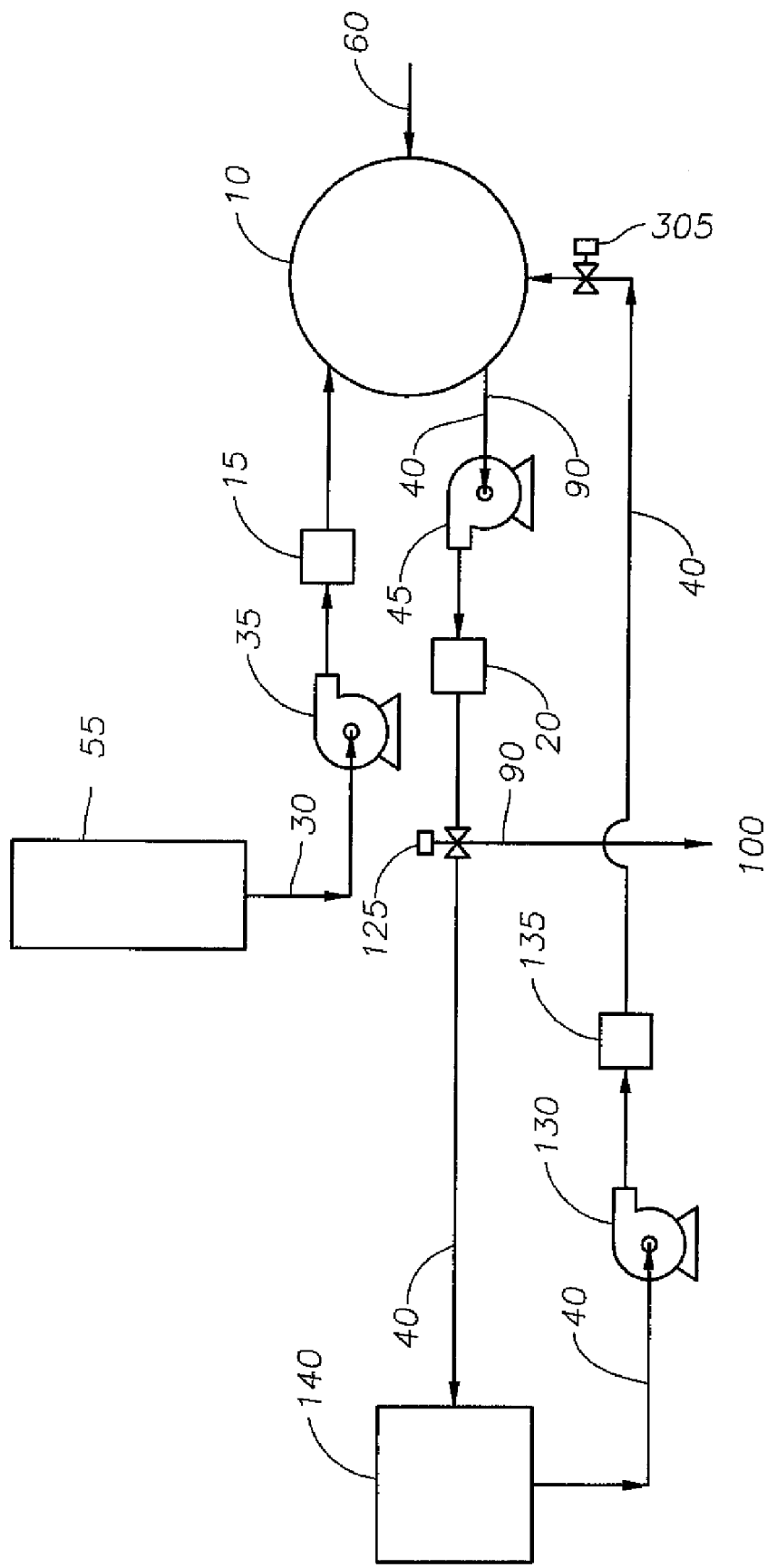
FIG. 4 illustrates a process for the concentration and dilution of a treatment fluid having a concentration blender and a storage unit.

FIG. 4 illustrates an embodiment of process 5 including valve 125, which directs the flow of concentrated treatment fluid 40 downhole to wellbore 100 or to storage unit 140. Valve 125 may include any valve suitable for directing the flow of a liquid. Storage unit 140 may include any apparatus suitable for storing a liquid. For instance, storage unit 140 may be a tank, a transportation unit, and the like. In an embodiment, storage unit 140 is a transportation unit.

In embodiments as illustrated in FIG. 4, valve 125 directs the flow of concentrated treatment fluid 40 to storage unit 140. Without limitation, in such an embodiment, concentration blender 10 provides the concentration function as well as the dilution function of dilution blender 70. Concentrated treatment fluid 40 may be stored in storage unit 140 for any desirable amount of time. In some embodiments, concentrated treatment fluid 40 is stored in storage unit 140 until desired to send fluid downhole to wellbore 100. For instance, in an embodiment in which storage unit 140 is a transportation unit, concentrated treatment fluid 40 may be stored in storage unit 140 during movement until it is desired to send fluid downhole to wellbore 100. When desired to send fluid downhole to wellbore 100, concentrated treatment fluid 40 is returned to concentration blender 10 by storage outlet pump 130. In some embodiments, the flow rate of concentrated treatment fluid 40 returned to concentration blender 10 may be controlled by valve 305. Valve 305 may be any valve suitable for controlling a liquid flow such as a V-port ball valve. The flow rate of concentrated treatment fluid 40 to concentration blender 10 is measured by storage outlet flow meter 135. Storage outlet flow meter 135 may be located at any position downstream of storage outlet pump 130 that is suitable for measuring the flow of concentrated treatment fluid 40. When concentrated treatment fluid 40 is fed to concentration blender 10, treatment fluid 30 is fed to concentration blender 10 to dilute concentrated treatment fluid 40 to provide diluted treatment fluid 90. Treatment substance 60 is not added to concentration blender 10 during dilution of concentrated treatment fluid 40. Diluted treatment fluid 90 exits concentration blender 10 and is pumped by concentration outlet pump 45 downhole to wellbore 100. The flow rate of diluted treatment fluid 90 is measured by concentration blender outlet flow meter 20. The flow rates of concentrated treatment fluid 40 and treatment fluid 30 to concentration blender 10 are adjusted to control the properties of diluted treatment fluid 90. In the embodiments illustrated in FIG. 4 in regards to the dilution function of concentration blender 10, it is to be understood that concentration outlet pump 45 and concentration blender outlet flow meter 20 also serve the function of outlet pump 150 and outlet flow meter 95, and concentration blender inlet feed pump 35 and concentration blender inlet flow meter 15 serve the function of dilution feed pump 80 and dilution blender inlet flow meter 85 of the embodiments illustrated in FIGS. 1 and 2.

Figure 5:
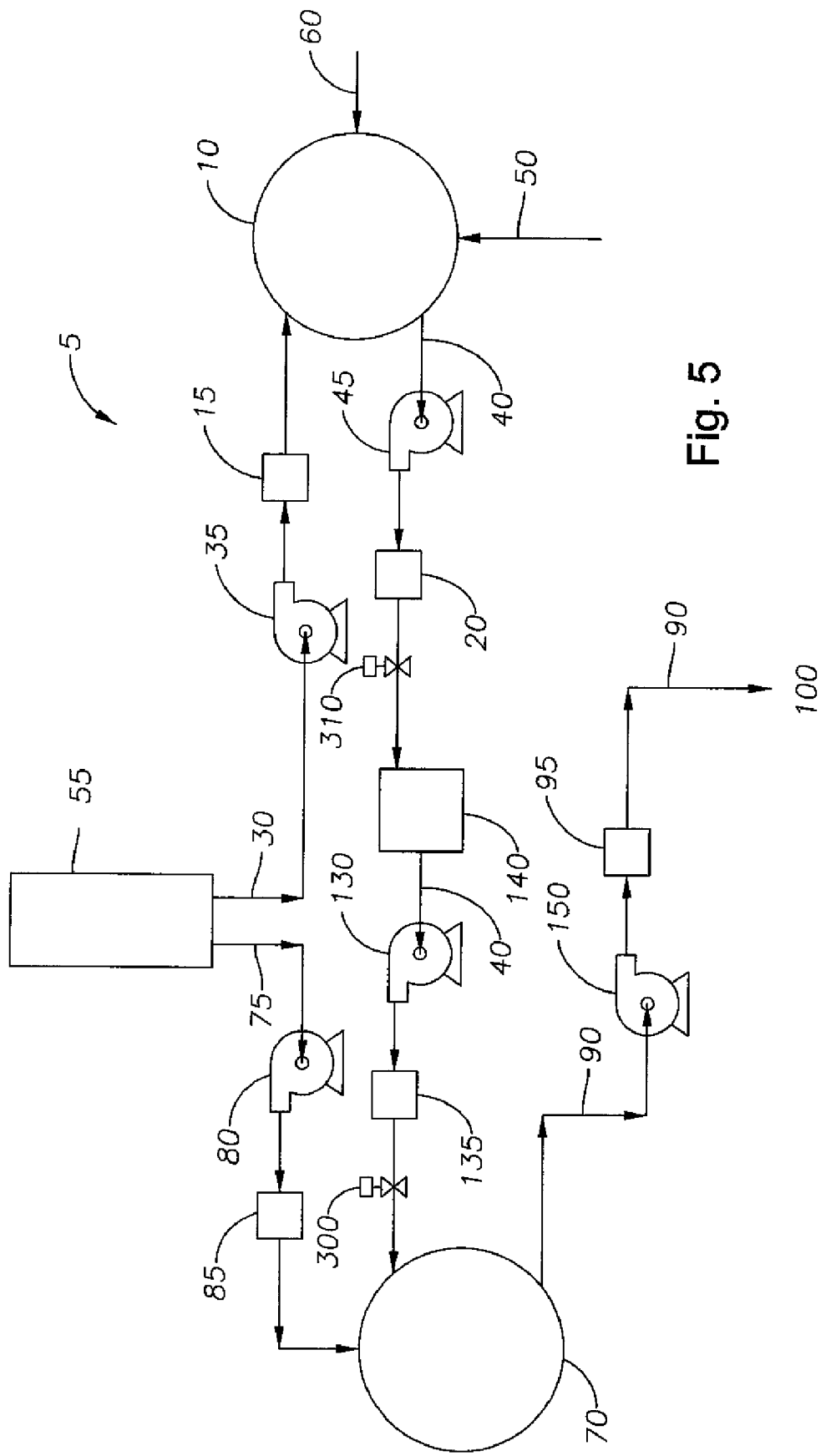
FIG. 5 illustrates a process for the concentration and dilution of a treatment fluid having a concentration blender, dilution blender, and a storage unit.

FIG. 5 illustrates an embodiment in which concentrated treatment fluid 40 is fed from storage unit 140 to dilution blender 70 for dilution instead of being re-cycled to concentration blender 10 for dilution. In such embodiment, concentrated treatment fluid 40 is pumped to storage unit 140 and stored until dilution is desired. In some embodiments, the flow rate of concentrated treatment fluid 40 to storage unit 140 may be controlled by valve 310. Valve 310 may be any valve suitable for controlling a liquid flow such as a V-port ball valve. Concentration blender outlet flow meter 20 measures the flow rate out of concentration blender 10 to storage unit 140. From storage unit 140, concentrated treatment fluid 40 is fed to dilution blender 70 by storage outlet pump 130. Storage outlet flow meter 135 measures the flow rate of concentrated treatment fluid 40 to dilution blender 70. Properties of diluted treatment fluid 90 are adjusted by controlling the flow rate of dilution fluid 75 and/or concentrated treatment fluid 40 to dilution blender 70.

It is to be understood that each pump 35, 45, 80, 130, 150 may represent one pump or more than one pump. For instance, more than one pump may include a series of pumps. It is to be further understood that process 5 is not limited to the flow meters disposed downstream of the pumps. In alternative embodiments (not illustrated), any or all of the flow meters may be disposed upstream of the pumps.

In the embodiments illustrated in FIGS. 1-3, process 5 is a continuous process for concentrating and then diluting a treatment fluid prior to introduction to wellbore 100. In the embodiments illustrated in FIGS. 4-5, process 5 is a batch process for concentrating and then diluting a treatment fluid prior to introduction to wellbore 100.

In embodiments, process 5 includes a process controller (i.e., control system), which is an automated process for controlling process 5. The automated process may be controlled by any suitable means such as by software and electronic hardware. For instance, in an embodiment, a target concentration of treatment substance 60 in concentrated treatment fluid 40 is input into the control system. The specific gravity of treatment substance 60 is also input into the control system. In addition, a target difference between the concentrated treatment fluid 40 flow rate and the treatment fluid 30 flow rate is input. The target difference may be a target of the concentrated treatment fluid 40 flow rate subtracted by the treatment fluid 30 flow rate or a ratio of the concentrated treatment fluid 40 flow rate to the treatment fluid 30 flow rate. In alternative embodiments, calibration values may also be added to the control system. The control system may continually calculate the actual concentration of treatment substance 60 in concentrated treatment fluid 40 by using the inlet flow rate of treatment fluid 30 to concentration blender 10, the outlet flow rate of concentrated treatment fluid 40 from concentration blender 10, and the actual specific gravity of treatment substance 60. The control system may also continually adjust treatment fluid 30 flow rate to concentration blender 10 and/or the treatment substance 60 feed rate to concentration blender 10 based on the input target concentration of treatment substance 60 in concentrated treatment fluid 40, the calculated actual concentration of treatment substance 60 in concentrated treatment fluid 40, and optionally the calibration values. Such adjustment closes the loop that includes concentrating treatment substance 60 in concentration blender 10 and also provides quantifiable measurements. In addition, the control system controls dilution of concentrated treatment fluid 40. For the dilution, the control system continually adjusts flow rates to deliver the desired diluted treatment fluid 90 based upon the input target ratio of concentrated treatment fluid 40 to treatment fluid, the inlet flow rate of concentrated treatment fluid 40, and the inlet fluid flow rate of dilution fluid 75 (or treatment fluid 30 in the embodiment illustrated in FIG. 4). In alternative embodiments, the control system intermittently makes the determinations and the adjustments.

To further illustrate various illustrative embodiments of the present invention, the following examples are provided.

EXAMPLE 1

Figure 6:
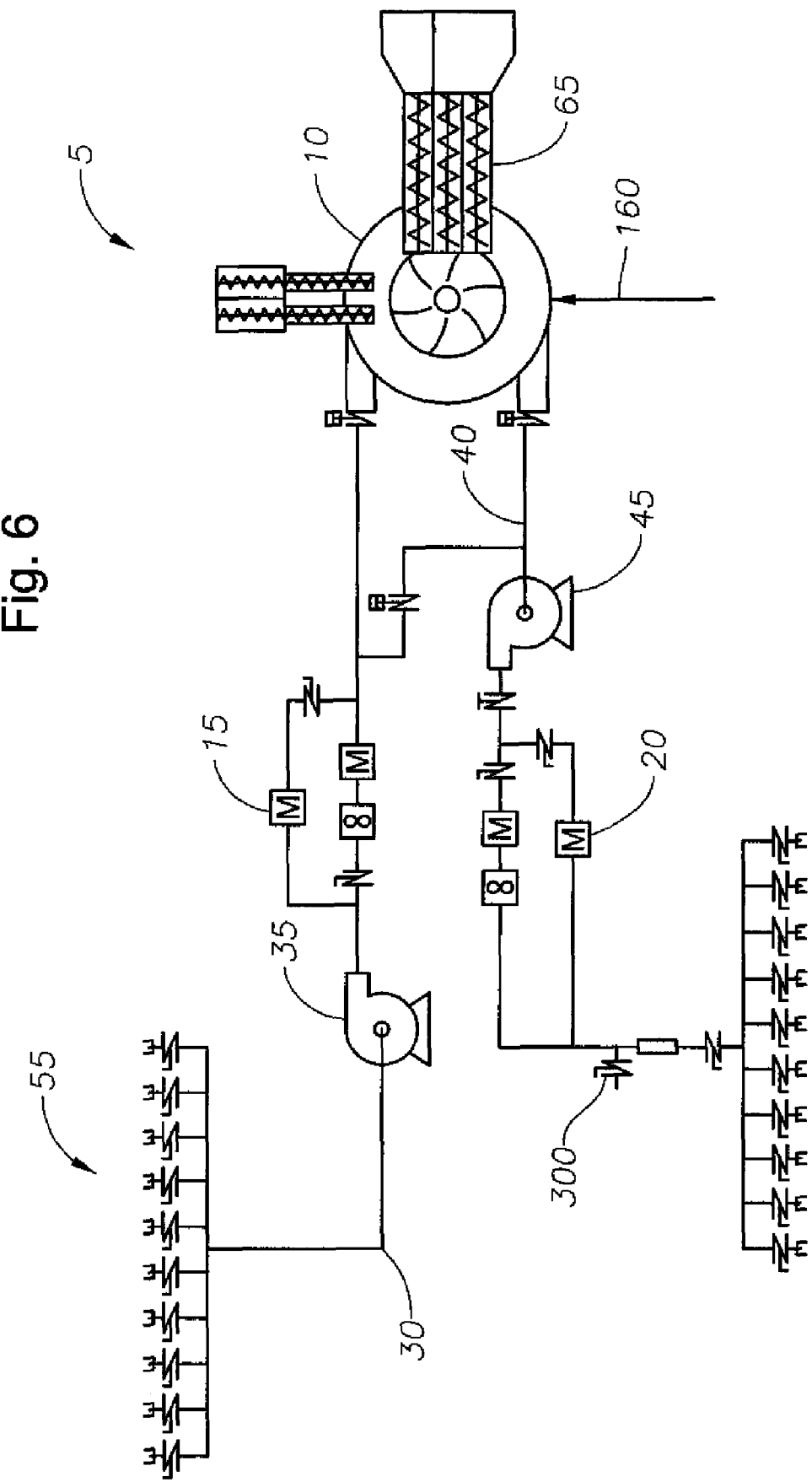
FIG. 6 illustrates a process for concentrating a proppant as used in Examples 1 and 2.

A treatment substance 60 was concentrated in a treatment fluid 30 using the ultralight mode set-up illustrated in FIG. 6. The treatment substance 60 used was LITEPROP 108, which was a proppant commercially available from BJ Services Company. The treatment fluid 30 was water. In FIG. 6, treatment fluid supply 55 was frac tanks. Treatment fluid 30 was pumped by concentration blender inlet feed pump 35 to concentration blender 10. Concentration blender inlet feed pump 35 was a centrifugal pump. Concentration blender inlet flow meter 15 was a 3 inch magnetic flow meter. Concentration blender 10 was a closed tub blender. The closed tub blender was modified with valve 300, which was a two inch V-port ball valve. Sand screw assembly 65 was used to feed the proppant to concentration blender 10. The process line sizes, by-pass lines, and corresponding valves of process 5 are illustrated in FIG. 6. Concentration outlet pump 45 was a centrifugal pump. A process controller with software was used to automatically control the concentration. The process controller used was a multi-channel process controller. The software was updated to include a calculation to compare the suction flow rate to the discharge flow rate to control the sand screw assembly 65 speed.

The first step was to calibrate sand screw assembly 65 using the proppant. After calibrating the sand screw assembly 65, concentration blender 10 was rigged up to a water transport (e.g., frac tanks of treatment fluid supply 55) and a transport for storage of the concentrated proppant (e.g., concentrated treatment fluid 40). Proppant was staged in four 2,000 pound super sacks. Concentration blender inlet feed pump 35 supplied treatment fluid 30 from the water transport (treatment fluid supply 55) to concentration blender 10. Sand screw assembly 65 then added the proppant to concentration blender 10. The sacks of proppant were suspended over the sand hopper on concentration blender 10, and the sand screws conveyed the proppant to the mixing tub of concentration blender 10. After each 2,000 pound sack of proppant, the level was checked in the transport to verify that the volumes were correct and that the volumes recorded in the software for concentration blender 10 matched the measured volumes. Concentration outlet pump 45 was used to supply concentrated treatment fluid 40 to the 2 inch V port ball valve 300. The discharge from the 2 inch V port ball valve 300 was sent to the transport.

Figure 7:
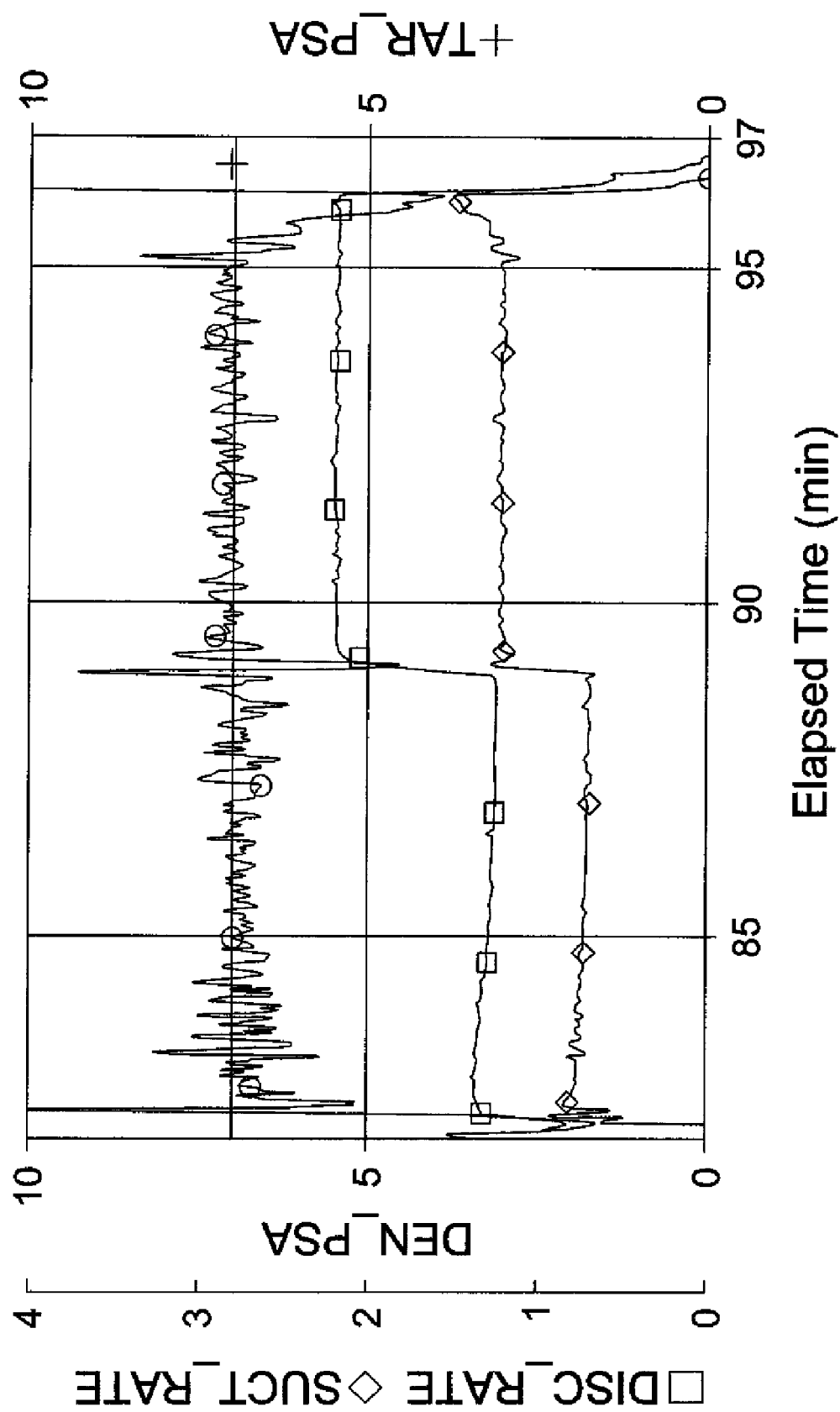
FIG. 7 illustrates flow rates, calculated densities, and target densities of Example 1.

FIG. 7 shows the suction rate (SUCT_RATE) from concentration blender inlet feed pump 35 and the discharge rate (DISC_RATE) from concentration outlet pump 45. The target density (TAR_PSA) indicated the target density at 7 PPA. DEN_PSA was the calculated density of the slurry based on the difference between the suction and discharge rates. At the end of the stage, the calculated density dropped, and the suction flow rate increased because the sand screws were not fully loaded.

Figure 8:
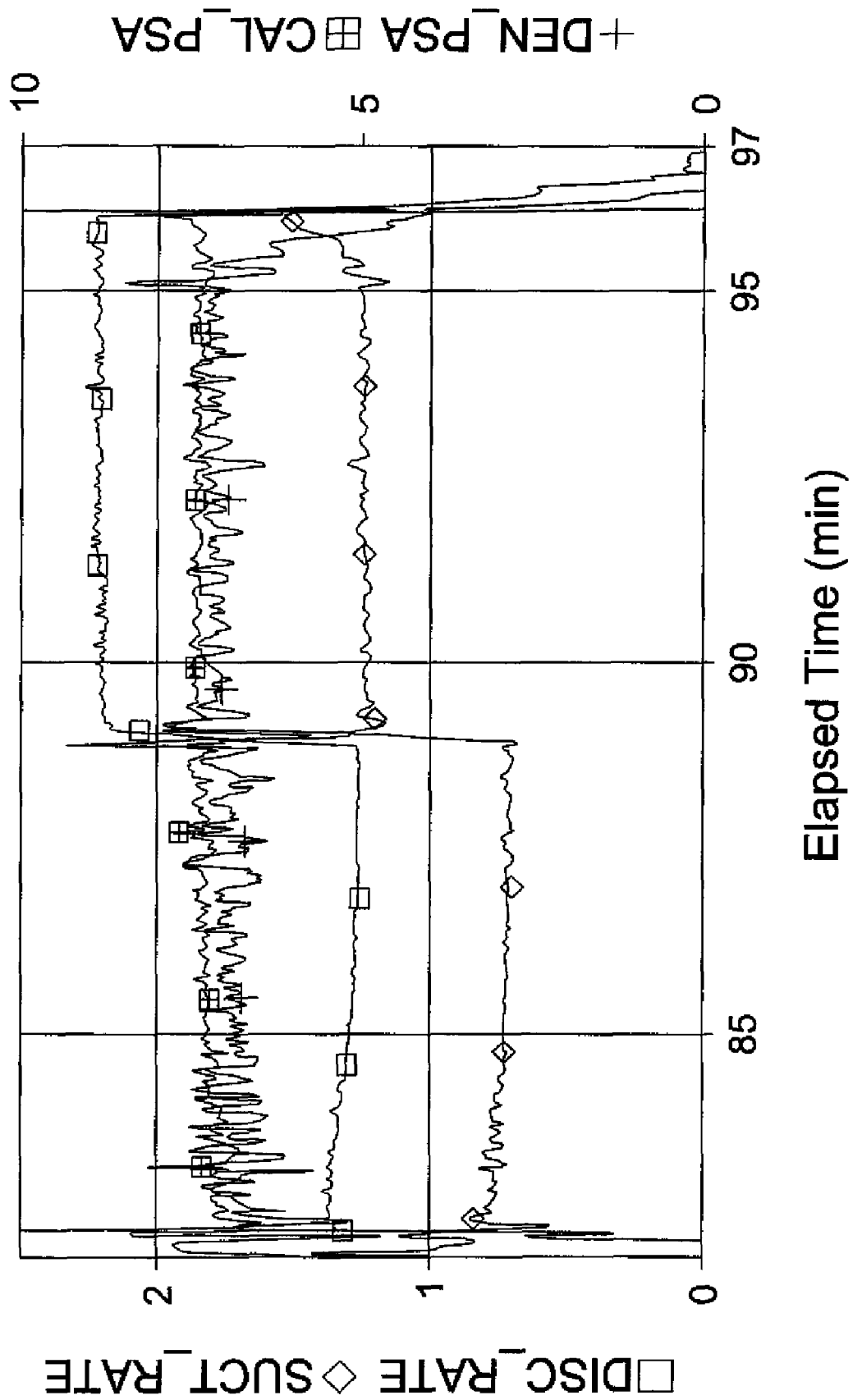
FIG. 8 illustrates flow rates, calculated densities, and target densities of Example 1.

FIG. 8 shows the suction rate (SUCT_RATE) from concentration blender inlet feed pump 35 and the discharge rate (DISC_RATE) from concentration outlet pump 45. DEN_PSA was the calculated density using the difference between the suction rate and the discharge rate. CAL_PSA was the density based on the suction rate and the sand screw revolutions per minute, with 6.4 pounds/revolution assumed. It was noted that the DEN_PSA density dropped at the end of the stage because the proppant supply was running out. However, the CAL_PSA did not change because it assumed the sand screws were filly loaded. Therefore, DEN_PSA provides a more accurate density reading over CAL_PSA because it takes into account proppant not being added to the slurry.

Figure 9:
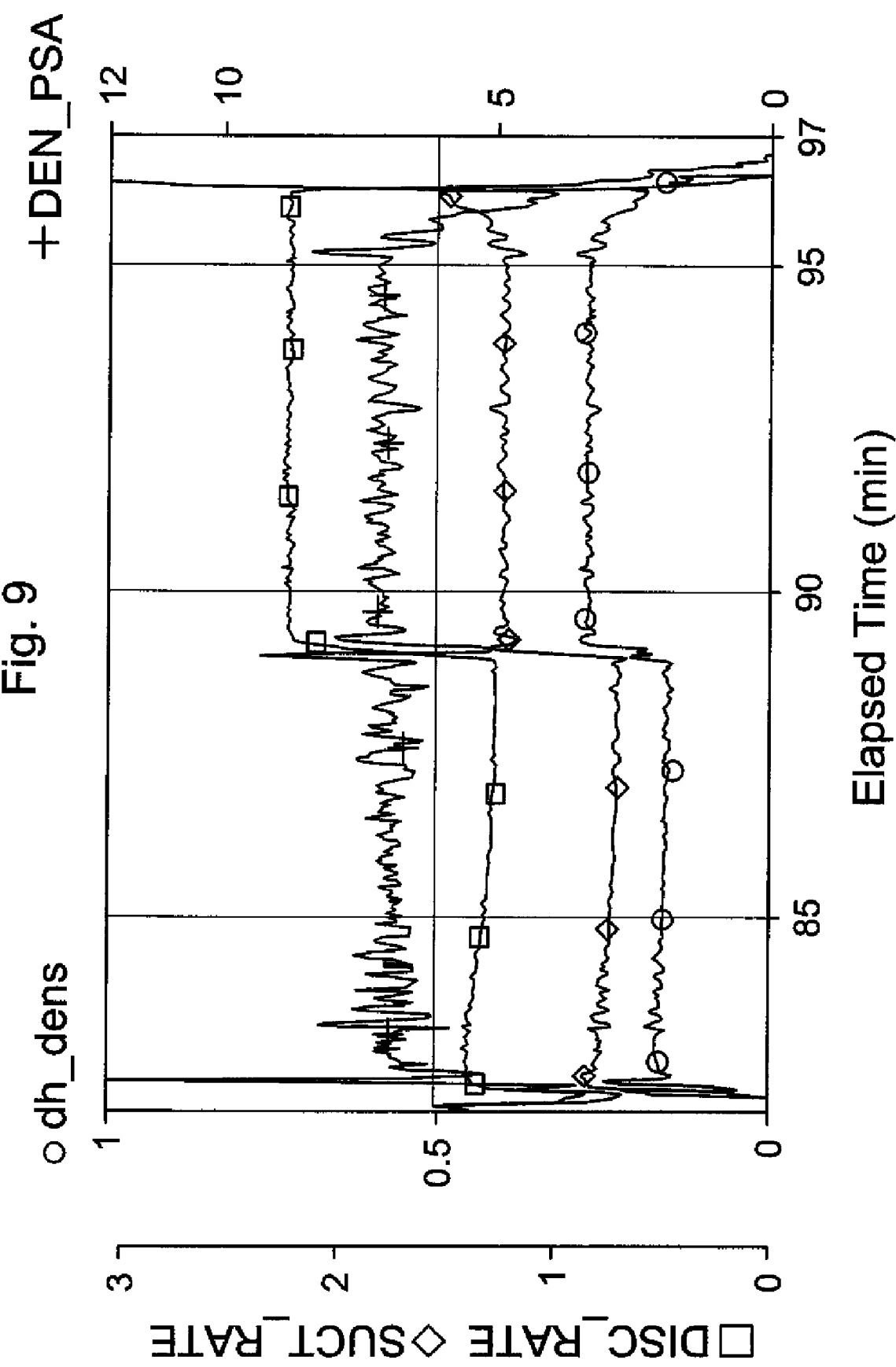
FIG. 9 illustrates flow rates, calculated densities, and calculated downhole densities of Example 1.

FIG. 9 illustrates DISC_RATE, SUCT_RATE, DEN_PSA, and a calculated downhole density (dh_dens), with 30 BPM assumed. The target was 0.15 PPA and 0.3 PPA.

The testing proved that the suction and discharge flow rates were accurately measured using magnetic flow meters. It also proved that the delta between the two flow rates was equal to the volume of proppant added. In addition, it proved that the speed of the sand screws was controlled by using the delta to proportion the proppant into concentration blender 10. Moreover, it was found that by volume measurements the volume of proppant added was shown.

Consequently, Example 1 showed that a proppant slurry was accurately built on the fly using an ultralight mode on concentration blender 10. It was also found that a concentrated slurry was diluted on the fly to prepare the desired downhole density.

EXAMPLE 2

The set-up illustrated in FIG. 6 was used for Example 2. The treatment fluid 30 was water. In FIG. 6, treatment fluid supply 55 was frac tanks. Treatment fluid 30 was pumped by concentration blender inlet feed pump 35 to concentration blender 10. Concentration blender inlet feed pump 35 was a centrifugal pump with a variable flow control. Concentration blender inlet flow meter 15 was a 3 inch magnetic flow meter. Concentration blender 10 was a closed tub blender. The closed tub blender was modified with valve 300, which was a two inch V-port ball valve. Sand screw assembly 65 was used to feed the proppant to concentration blender 10. The process line sizes, by-pass lines, and corresponding valves of process 5 are illustrated in FIG. 6. Concentration outlet pump 45 was a centrifugal pump. A process controller with software was used to automatically control the concentration. The process controller used was a multi-channel process controller. The software was updated to include a calculation to compare the suction flow rate to the discharge flow rate to control the sand screw speed.

Concentration blender inlet feed pump 35 was used to add water from treatment fluid supply 55 (frac tanks) to concentration blender 10. Concentration blender inlet flow meter 15 was a 3 inch magnetic flow meter, which monitored the flow from concentration blender inlet feed pump 35. In Example 2, no treatment substance 60 was added to concentration blender 10. Instead, water 160 was added to concentration blender 10, and the water 160 rate was used to simulate the proppant volume. It is to be understood that water 160 was used for Example 2 and not Example 1.

Concentration blender inlet feed pump 35 fed treatment fluid 30 to concentration blender 10, and concentration outlet pump 45 was used to supply concentrated treatment fluid 40 to the 2 inch V port valve 300. A desire of Example 2 was for the treatment fluid 30 flow rate and the concentrated treatment fluid 40 flow rate to be about equal. In the next step, water 160 was added to simulate adding proppant. It was desired for the suction rate (from concentration blender inlet feed pump 35) plus the added water 160 flow rate to equal the discharge rate (from concentration outlet pump 45). The rate was controlled via the V port ball valve 300.

Figure 10:
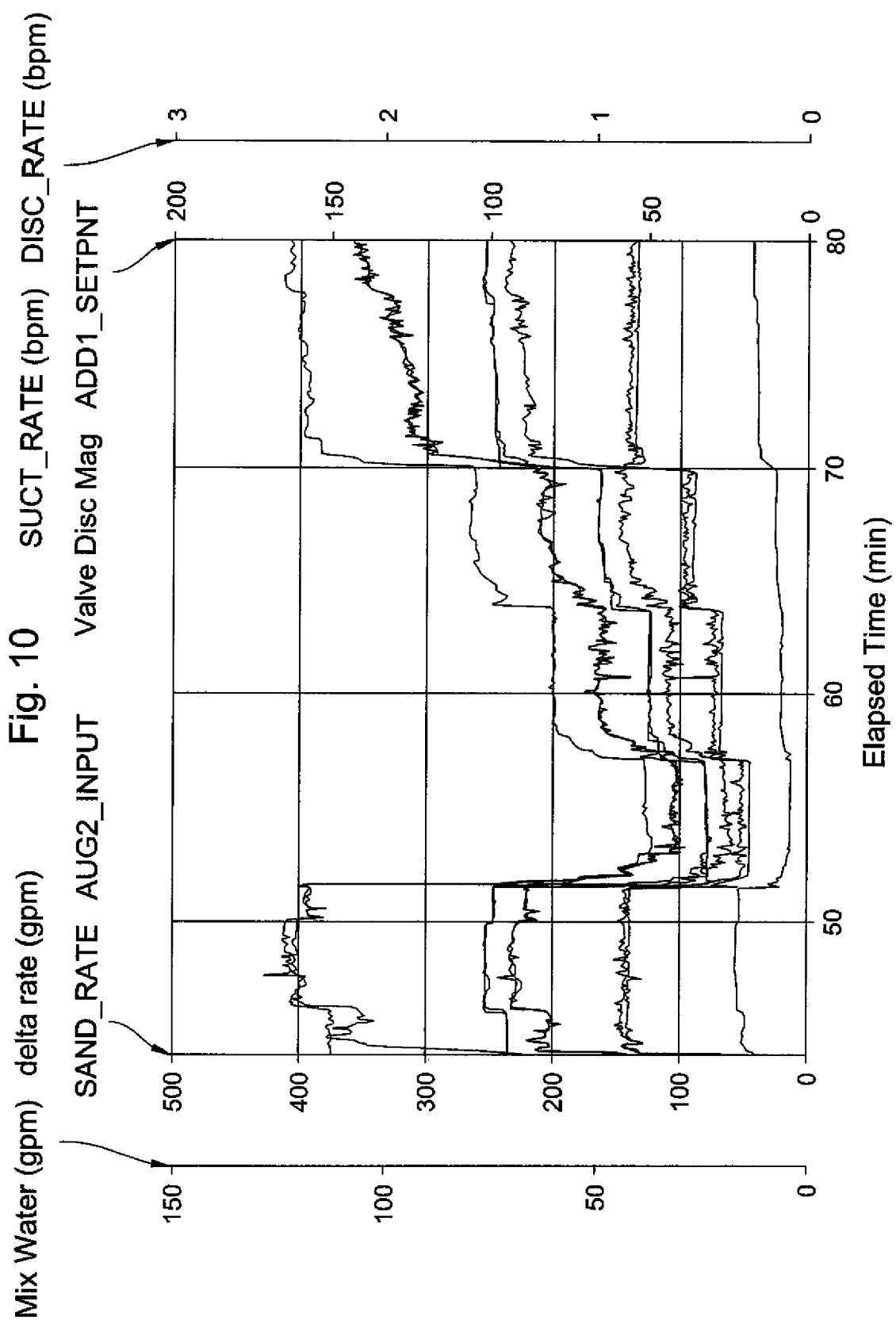
FIG. 10 illustrates various flow rates of Example 2.

FIG. 10 illustrates the various flow rates. The SUCT_RATE was from concentration blender inlet feed pump 35, and the DISC_RATE was from the concentration outlet pump 45. DISC_RATE minus the SUCT_RATE was the delta rate, which was the volume of added water 160 that simulated the proppant. The Mix Water was the added water 160 rate. The delta rate was the measured difference between the DISC_RATE and the SUCT_RATE using the 3 inch magnetic flow meters. The Mix Water rate and the delta rate were desired to be equal. FIG. 10 shows the Mix Water rate and the delta rate to be very close with a slight offset.

The AUG2_INPUT is the revolutions per minute of the sand screws and was automatically controlled via the control system based on the difference between the DISC_RATE and the SUCT_RATE. VALVE DISC MAG was the actual flow rate of the V-port ball valve 300. ADD1_SETPNT was the theoretical target of the V-port ball valve 300. SAND_RATE was the rate of the sand screws, which were run to simulate proppant addition.

Figure 11:
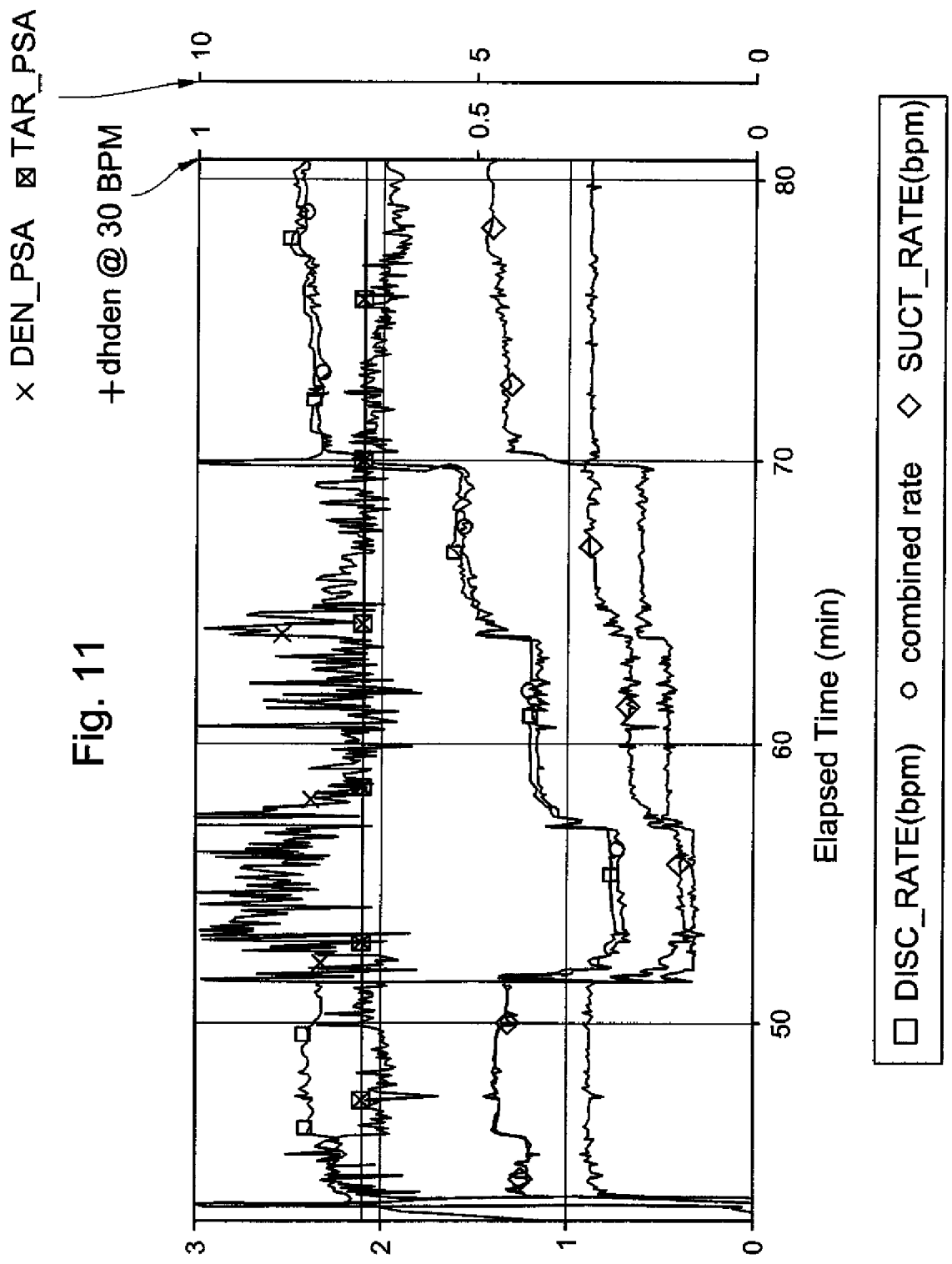
FIG. 11 illustrates densities of Example 2.

FIG. 11 shows the DISC_RATE and the SUCT_RATE. FIG. 11 also shows the combined rate, which was the Mix Water rate (160) and SUCT_RATE (30). In addition, FIG. 11 shows a calculated downhole density (dhden) with an assumed 30 BPM. The reference dhden was a theoretical downhole density based on an assumed 30 PPM flow rate. The target density (TAR_PSA) programmed into the controller was 0.1 PPA, 0.15 PA, 0.2 PPA, and 0.3 PPA. DEN_PSA is the calculated density using the difference between the DISC_RATE and the SUCT_RATE.

Example 2 showed that the suction and discharge flow rates were accurately measured using magnetic flow meters and that the delta between the two flow rates was equal to the volume of proppant added. It was further shown that using the delta, the speed of the sand screws was controlled to proportion the proppant into concentration blender 10. In addition, it was shown that by volume measurements, the volume of proppant added was determined. Furthermore, it was shown that using the proppant slurry (DISC_RATE), the correct amount of slurry was added to create the desired downhole density (dhden).

Although the present invention and its advantages have been described in detail, it should be understood that various changes, substitutions and alterations may be made herein without departing from the spirit and scope of the invention as defined by the appended claims.

What is claimed is:

1. A process for preparing a diluted treatment fluid for introduction to a wellbore, comprising:
   (A) measuring a treatment fluid flow rate;
   (B) blending the treatment fluid with a treatment substance to produce a concentrated treatment fluid;
   (C) measuring a flow rate of the concentrated treatment fluid;
   (D) determining a difference between the treatment fluid flow rate and the flow rate of the concentrated treatment fluid;
   (E) comparing the difference to a target difference;
   (F) adjusting the difference to be within a desired range of the target difference; and
   (G) diluting the concentrated treatment fluid to provide the diluted treatment fluid.

2. The process of claim 1, wherein the treatment fluid comprises water, diesel, mineral oil, gels, foam, acid, or any combinations thereof.

3. The process of claim 1, wherein the treatment substance comprises a proppant, a polymer, a cement, or glass beads.

4. The process of claim 1, wherein measuring the treatment fluid flow rate and the flow rate of the concentrated treatment fluid are accomplished by flow meters.

5. The process of claim 4, wherein the flow meters are magnetic flow meters.

6. The process of claim 1, wherein the blending is accomplished in a blender.

7. The process of claim 6, wherein the treatment substance is a proppant, and wherein a sand screw assembly feeds the proppant to the blender.

8. The process of claim 1, further comprising blending additives with the treatment substance and the treatment fluid.

9. The process of claim 1, wherein adjusting the difference comprises adjusting feed of the treatment substance to the blending, adjusting the treatment fluid flow rate to the blending, or any combination thereof.

10. The process of claim 1, wherein the desired range is about equal to the target difference.

11. The process of claim 1, wherein the difference corresponds to a volume of the treatment substance added to the blending.

12. The process of claim 1, wherein diluting is accomplished in a blender.

13. The process of claim 1, wherein diluting is accomplished in a dilution mix section, wherein the dilution mix section comprises a pipe section.

14. The process of claim 1, wherein the blending is accomplished in a concentration blender, and wherein the diluting is accomplished in a dilution blender, and further wherein the concentrated treatment fluid is fed from the concentration blender to the dilution blender.

15. The process of claim 14, wherein the concentrated treatment fluid is fed to a storage unit from the concentration blender prior to being fed to the dilution blender.

16. The process of claim 1, wherein the blending is accomplished in a concentration blender, and wherein the concentrated treatment fluid is fed from the concentration blender to a storage unit for storage, and further wherein the concentrated treatment fluid is fed from the storage unit to the concentration blender for dilution.

17. The process of claim 1, wherein the concentrated treatment fluid is diluted by a dilution fluid comprising the same fluid as the treatment fluid.

18. The process of claim 1, wherein the process is controlled by a process controller.

19. The process of claim 18, further comprising providing a specific gravity of the treatment substance to the process controller, providing the target difference to the process controller, and providing a target concentration of the treatment substance in the diluted treatment fluid.

20. The process of claim 1, wherein the target difference comprises the treatment fluid flow rate subtracted from the flow rate of the concentrated treatment fluid or a ratio of the treatment fluid flow rate to the flow rate of the concentrated treatment fluid.

* * * * *